(12) United States Patent
Huang

(10) Patent No.: US 7,683,963 B2
(45) Date of Patent: Mar. 23, 2010

(54) METHOD OF DISTANCE ESTIMATION TO BE IMPLEMENTED USING A DIGITAL CAMERA

(75) Inventor: Dong Huang, Hang-Zhou (CN)

(73) Assignee: Asia Optical Co., Inc., Taichung (TW)

( * ) Notice: Subject to any disclaimer, the term of this patent is extended or adjusted under 35 U.S.C. 154(b) by 371 days.

(21) Appl. No.: 11/824,935

(22) Filed: Jul. 3, 2007

(65) Prior Publication Data
US 2008/0007627 A1 Jan. 10, 2008

(30) Foreign Application Priority Data
Jul. 6, 2006 (TW) .............................. 95124648 A

(51) Int. Cl.
*G03B 13/10* (2006.01)
*H04N 5/222* (2006.01)

(52) U.S. Cl. .................. 348/348; 348/346; 348/333.02; 396/120

(58) Field of Classification Search ............ 348/333.01, 348/333.02, 346, 348; 396/120, 121, 138, 396/139
See application file for complete search history.

(56) References Cited

U.S. PATENT DOCUMENTS

| 4,263,719 A | * | 4/1981 | Murdoch | 33/297 |
| 4,878,080 A | * | 10/1989 | Takehana et al. | 396/78 |
| 5,204,710 A | * | 4/1993 | Tsukamoto et al. | 396/85 |
| 2002/0149694 A1 | * | 10/2002 | Seo | 348/370 |

* cited by examiner

*Primary Examiner*—Tuan Ho
*Assistant Examiner*—Selam Gebriel
(74) *Attorney, Agent, or Firm*—Trop, Pruner & Hu, P.C.

(57) ABSTRACT

A method of distance estimation is to be implemented using a digital camera, and includes: selecting a pre-established reference dimension corresponding to a target whose distance is to be estimated; enabling operation of the digital camera to capture a clear image containing the target; obtaining a focal length corresponding to the captured clear image; calculating an image dimension for each of predetermined distance values with reference to the selected reference dimension and the focal length; and showing the distance values on a display unit at positions based on proportions of the calculated image dimensions. The distance of the target can be estimated as one of the distance values corresponding to a dimension of the target image contained in the clear image and shown on the display unit.

5 Claims, 16 Drawing Sheets

US 7,683,963 B2

METHOD OF DISTANCE ESTIMATION TO BE IMPLEMENTED USING A DIGITAL CAMERA

CROSS-REFERENCE TO RELATED APPLICATION

This application claims priority of Taiwanese application no. 095124648, filed on Jul. 6, 2006.

BACKGROUND OF THE INVENTION

1. Field of the Invention

The invention relates to a method of distance estimation, more particularly to a method of distance estimation to be implemented using a digital camera.

2. Description of the Related Art

As shown in FIG. 1, in U.S. Pat. No. 4,263,719, there is disclosed an optical device for use as a gun sight, telescope or viewfinder and capable of indicating the distance of a target from the user. The optical device includes a reticule 1 with vertically displaced segmented horizontal lines 101 that are calibrated to give the viewer an instant indication of range of the target without requiring mechanical adjustment. Although the distance of the target from the viewer may be determined through the reticule 1, the segmented horizontal lines 101 have a very high requirement of manufacturing precision. Moreover, once manufactured, the design and specification of the reticule 1 cannot be altered. In other words, an optical device can only be installed with a reticule 1 having a specific design and specification.

FIG. 2 illustrates a conventional digital camera 2 that is capable of distance measurement and that includes a laser emitter 201 and a laser receiver 202. When laser light emitted from the laser emitter 201 is reflected back to the laser receiver 202 from a target (not shown), a digital signal processor (not shown) in the digital camera 2 is able to calculate the distance between the target and the viewer based on the time difference between laser light emitting and laser light receiving, wherein the distance is equal to one half of the product of the calculated time difference and the speed of light.

However, the need to provide the digital camera 2 with the laser emitter 201 and the laser receiver 202 not only increases the size of the digital camera 2, but also increases the manufacturing cost of the digital camera 2 significantly.

SUMMARY OF THE INVENTION

Therefore, the object of the present invention is to provide a method of distance estimation to be implemented using a digital camera, which involves distance estimation from a clear image containing a target and captured by the digital camera.

According to one aspect of this invention, a method of distance estimation is to be implemented using a digital camera including a lens unit, a user interface unit, an image sensing unit, a display unit operable to display a target whose distance is to be estimated, and a processing unit coupled to the lens unit, the user interface unit, the image sensing unit and the display unit. The method comprises:

a) establishing in the processing unit reference dimensions that correspond respectively to different kinds of targets, and a set of predetermined distance values;

b) selecting one of the reference dimensions according to the target whose distance is to be estimated through the user interface unit;

c) enabling operation of the digital camera such that a clear image containing the target is captured through the lens unit and the image sensing unit;

d) enabling operation of the processing unit to obtain a focal length corresponding to the clear image captured in step c);

e) enabling operation of the processing unit to calculate an image dimension for each of the predetermined distance values with reference to the reference dimension selected in step b) and the focal length obtained in step d), wherein the image dimension is equal to the product of the reference dimension and the focal length divided by the corresponding distance value; and f) enabling the processing unit to control the display unit such that the distance values are shown on the display unit at positions based on proportions of the image dimensions calculated in step e), the distance values being shown together with the clear image containing the target, wherein the distance of the target can be estimated as one of the distance values corresponding to a dimension of the target contained in the clear image and shown on the display unit.

According to another aspect of this invention, a method of distance estimation is to be implemented using a digital camera including a lens unit, a user interface unit, an image sensing unit, a display unit operable to display a target whose distance is to be estimated, and a processing unit coupled to the lens unit, the user interface unit, the image sensing unit and the display unit. The method comprises:

a) establishing in the processing unit reference dimensions that correspond respectively to different kinds of targets;

b) selecting one of the reference dimensions according to the target whose distance is to be estimated through the user interface unit;

c) enabling operation of the digital camera such that a clear image containing the target is captured through the lens unit and the image sensing unit;

d) enabling operation of the processing unit to obtain a focal length corresponding to the clear image captured in step c);

e) obtaining an image dimension of the target contained in the clear image; and f) calculating an estimated distance of the target with reference to the reference dimension selected in step b), the focal length obtained in step d), and the image dimension obtained in step e), wherein the estimated distance is equal to the product of the reference dimension and the focal length divided by the image dimension.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
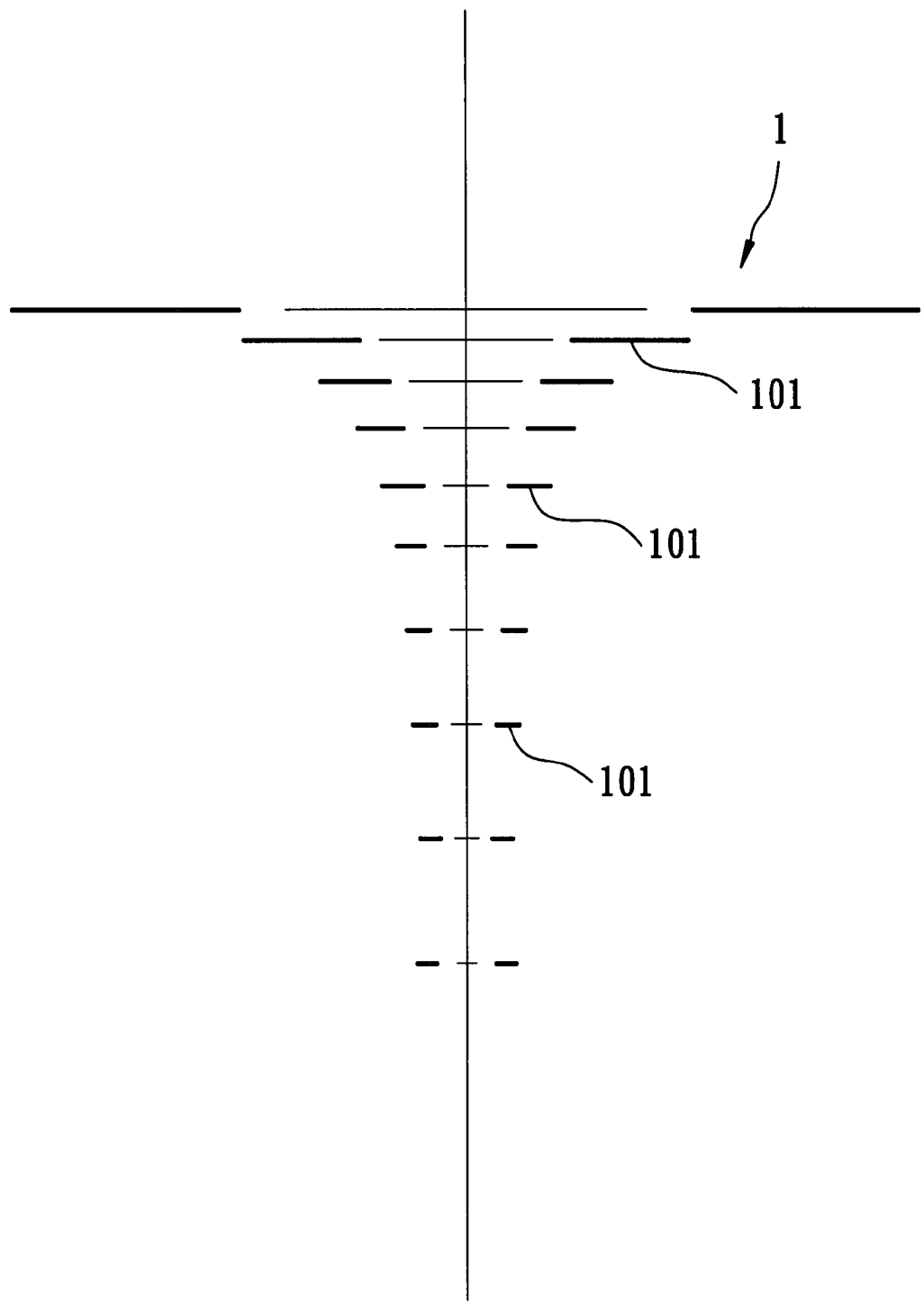
FIG. 1 is a planar schematic view of a reticule of an optical device according to U.S. Pat. No. 4,263,719.
Figure 2:
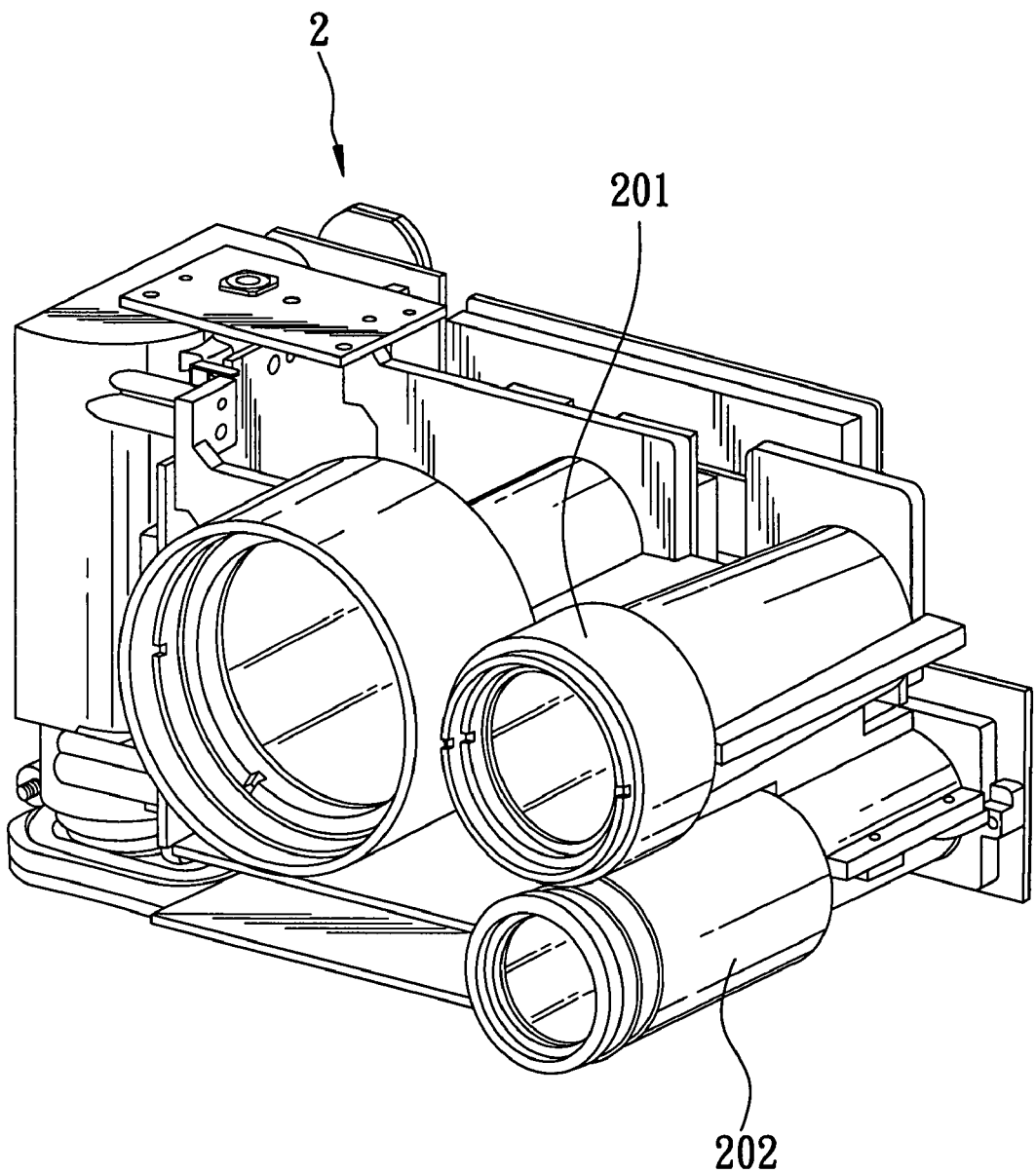
FIG. 2 is a perspective view of a conventional digital camera capable of distance estimation.

Before the present invention is described in greater detail with reference to the accompanying preferred embodiments, it should be noted herein that like elements are denoted by the same reference numerals throughout the disclosure.

Figure 3:
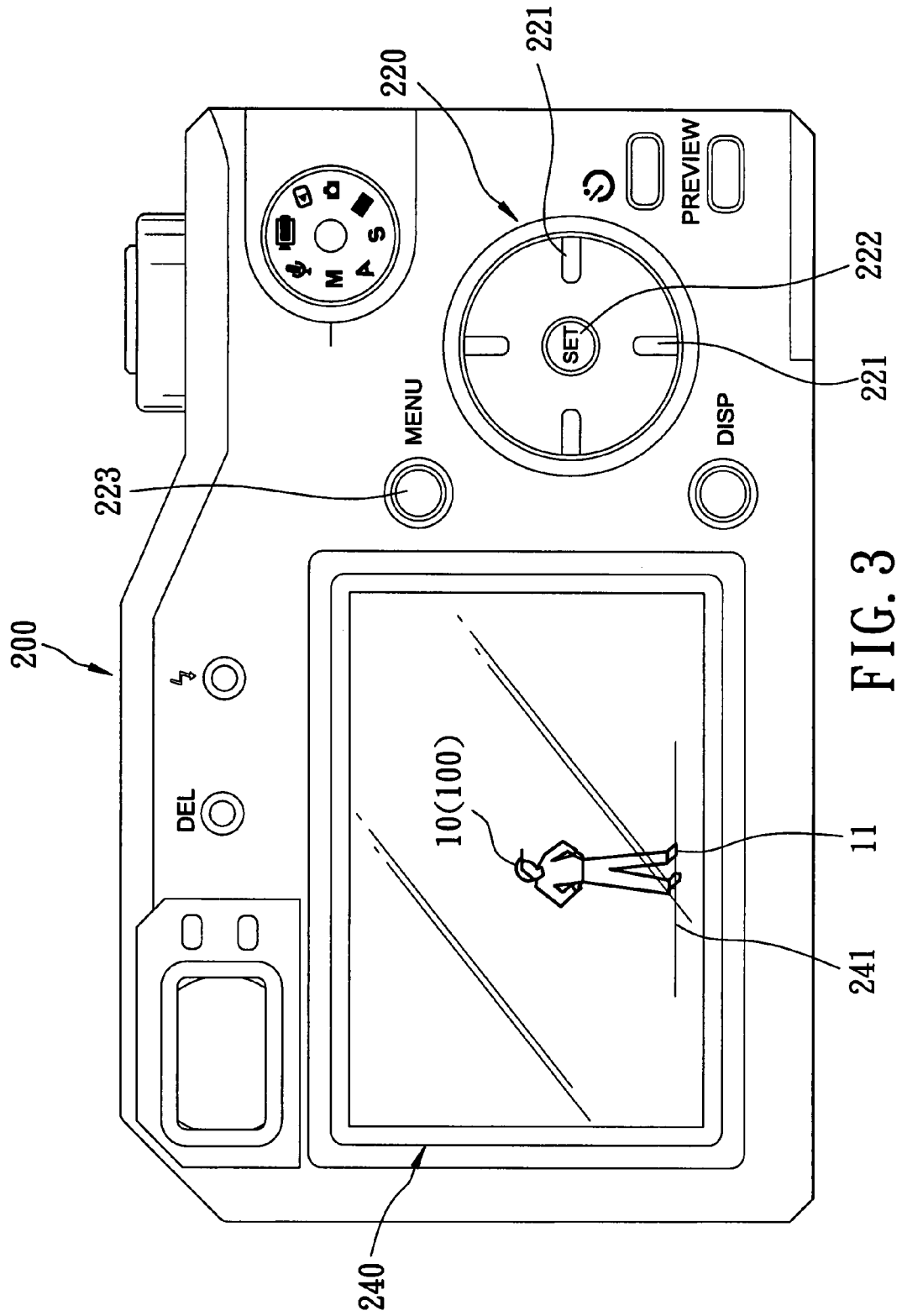
FIG. 3 is a schematic rear view of a digital camera for implementing the first preferred embodiment of a method of distance estimation according to the present invention.
Figure 4:
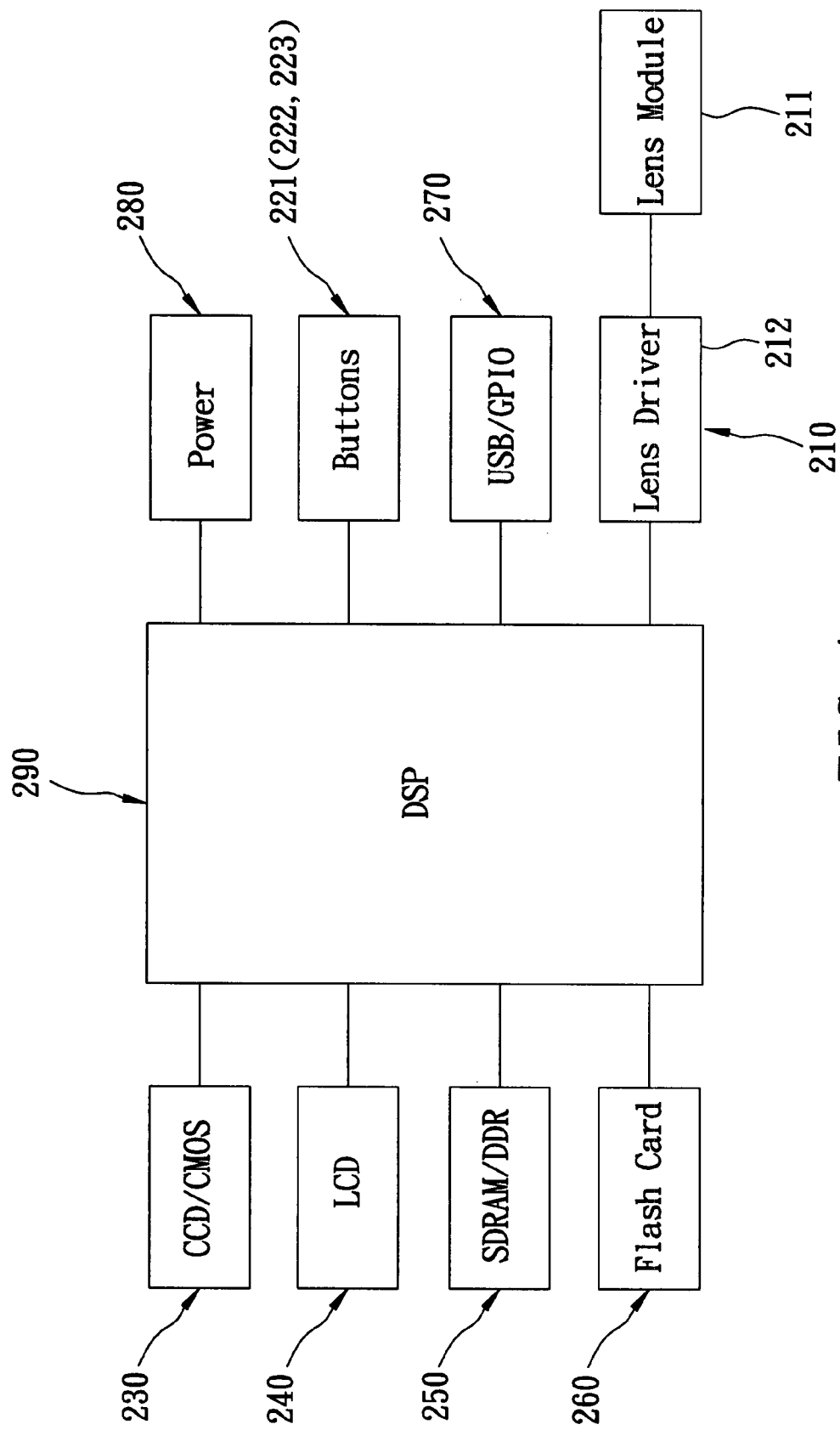
FIG. 4 is a system block diagram of the digital camera of FIG. 3.
Figure 5:
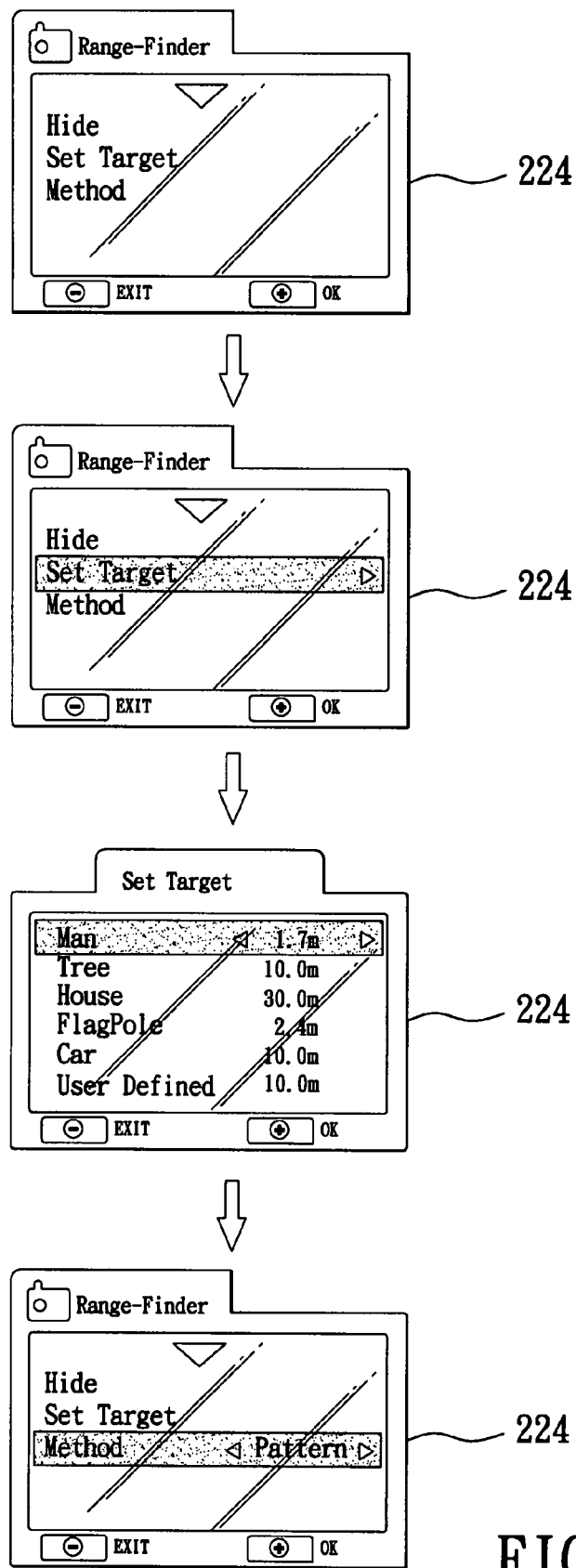
FIG. 5 illustrates a series of screen images shown on an operating interface screen of the digital camera when operated to implement the method of the first preferred embodiment.

Referring to FIGS. 3, 4 and 5, the first preferred embodiment of a method of distance estimation according to the present invention is to be implemented using a digital camera 200 that includes a lens unit 210, a user interface unit 220, an image sensing unit (CCD/CMOS) 230, a display unit (LCD) 240 operable to display a target 100 whose distance is to be estimated, a dynamic memory (SDRAM/DDR) 250, a flash card 260, a transmission port (USB/GPIO) 270, a power source 280, and a processing unit (digital signal processor or DSP) 290 coupled to the various units 210 to 280. The lens unit 210 includes a lens module 211 and a lens driver 212 (such as a stepper motor) for driving movement of the lens module 211 in a known manner. The user interface unit 220 includes a plurality of direction keys 221, a confirmation key 222, a function menu key 223, and an operating interface screen 224. The image sensing unit 230 can be a Charge Coupled Device (CCD) or a Complementary Metal-Oxide Semiconductor (CMOS) device.

Figure 6:
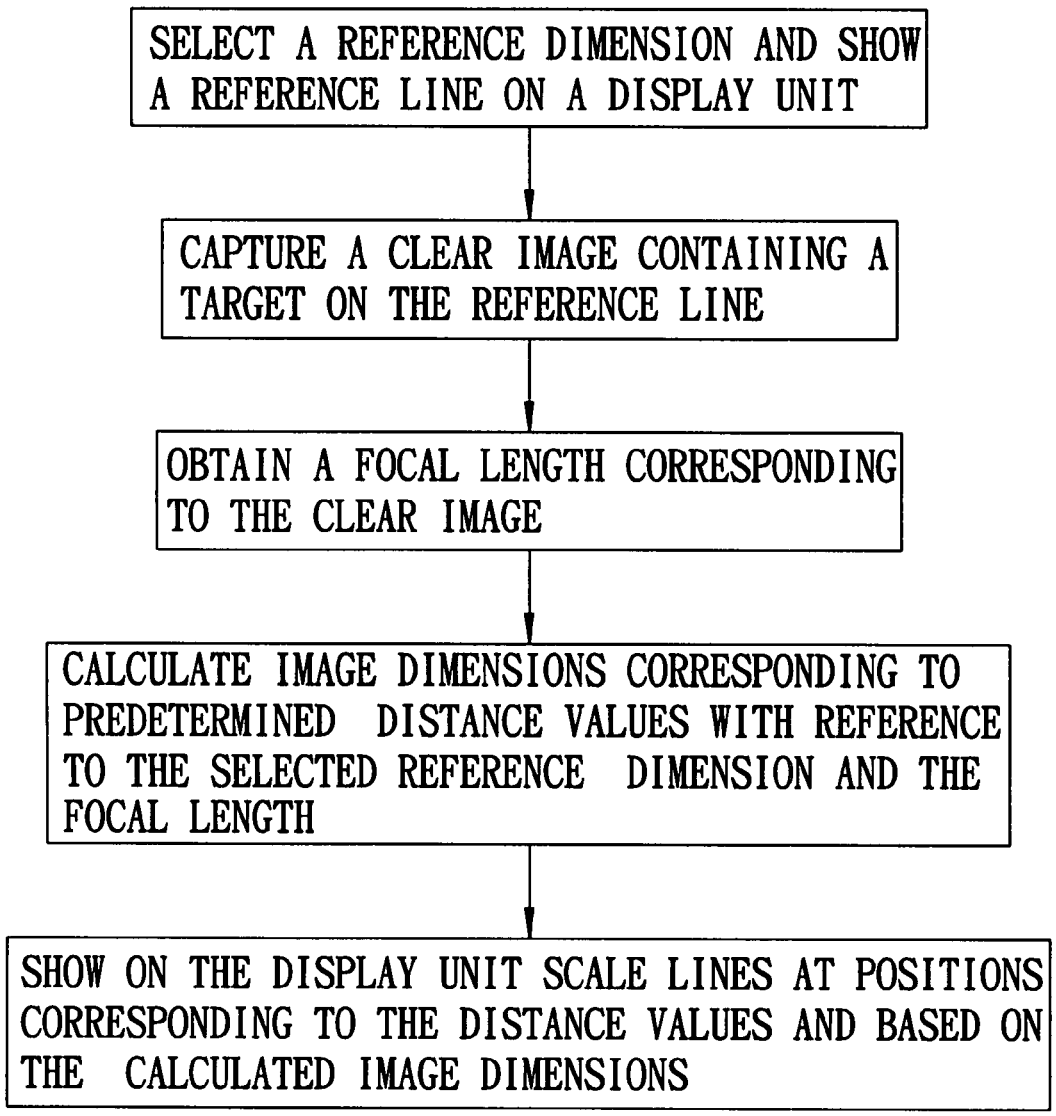
FIG. 6 is a flowchart of the first preferred embodiment.

As shown in FIG. 6, the method of distance estimation according to the first preferred embodiment includes the following steps:

Step 1: Referring again to FIGS. 3, 4 and 5, the function menu key 223 of the user interface unit 220 is operated so as to activate a Range-Finder operating interface screen 224. By operating the direction keys 221 and the confirmation key 222, one of a plurality of reference dimensions (H) pre-established in the processing unit 290 as well as a distance estimation method can be selected according to the target 100 whose distance is to be estimated. The reference dimensions (H) can include those for different kinds of targets 100, such as a man, a tree, a house, a flagpole and a car, and a user-defined reference dimension. In this embodiment, the target 100 is a man, and the pre-established reference dimension corresponding thereto is 1.7 m. The distance estimation method of the first preferred embodiment is called a pattern scheme to distinguish from the other embodiments of this invention. Upon completion of the above selection, the processing unit 290 controls the display unit 240 to show a reference line 241.

Step 2: Referring to FIGS. 3 and 4, the digital camera 200 is operated such that a clear image 10 containing the target 100 is captured through the lens unit 210 and the image sensing unit 230 in a conventional manner. In this embodiment, the clear image 10 containing the target 100 is obtained through zoom in/zoom out and auto focus adjustment (AF) of the digital camera 200. Moreover, a base point 11 in the clear image 10, such as a foot of the target 100, is aligned with the reference line 241.

Figure 7:
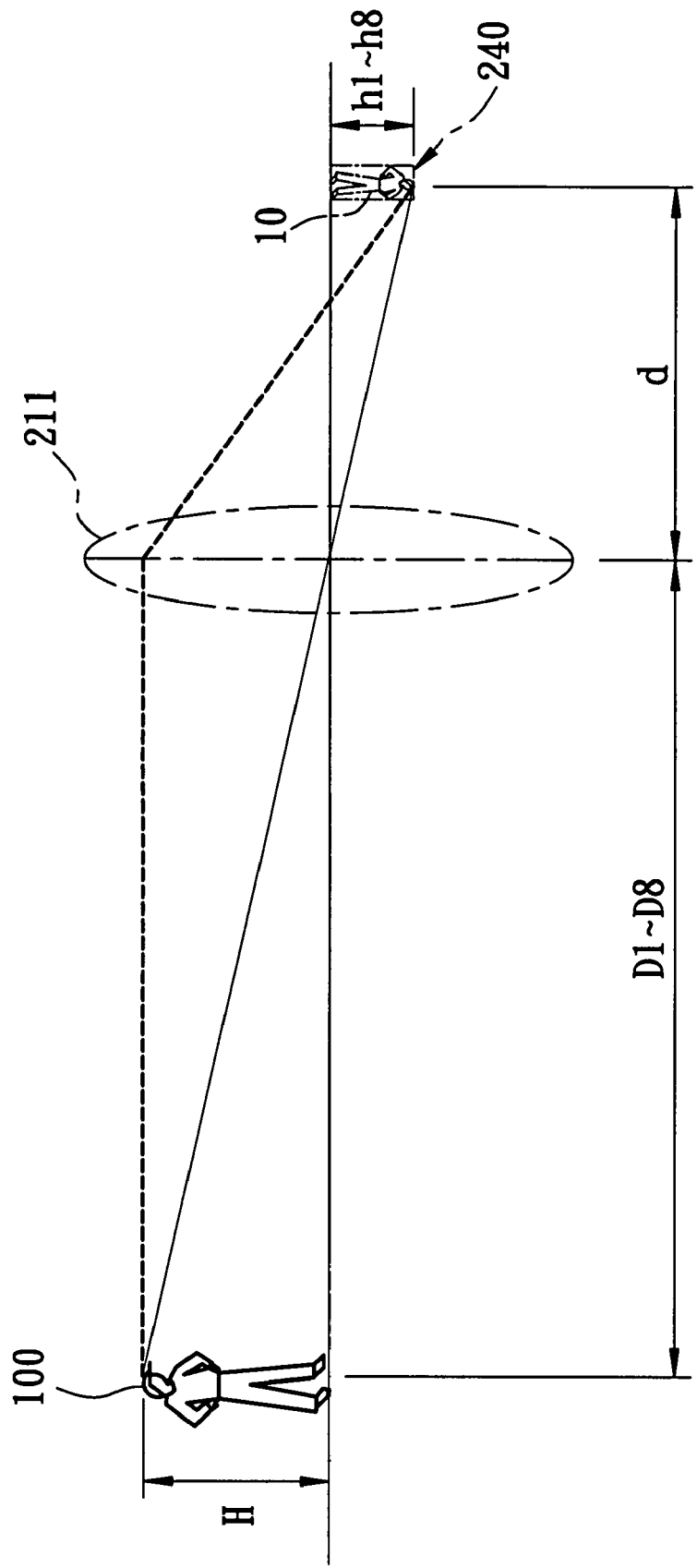
FIG. 7 is a schematic diagram illustrating a relation between a target and an image thereof.

Step 3: Referring to FIGS. 4 and 7, the processing unit 290 is operated to obtain a focal length (d) corresponding to the captured clear image 10. In this embodiment, when the lens driver 212 drives the lens module 211 for focus adjustment, the processing unit 290 detects displacement of the lens module 211 relative to the image sensing unit 230 through a position indicator or through computation of pulse number/pulse width of signals provided by the lens driver 212. Accordingly, the processing unit 290 is able to obtain a numerical value of the focal length (d) between the lens module 211 and the image sensing unit 230.

Figure 8:
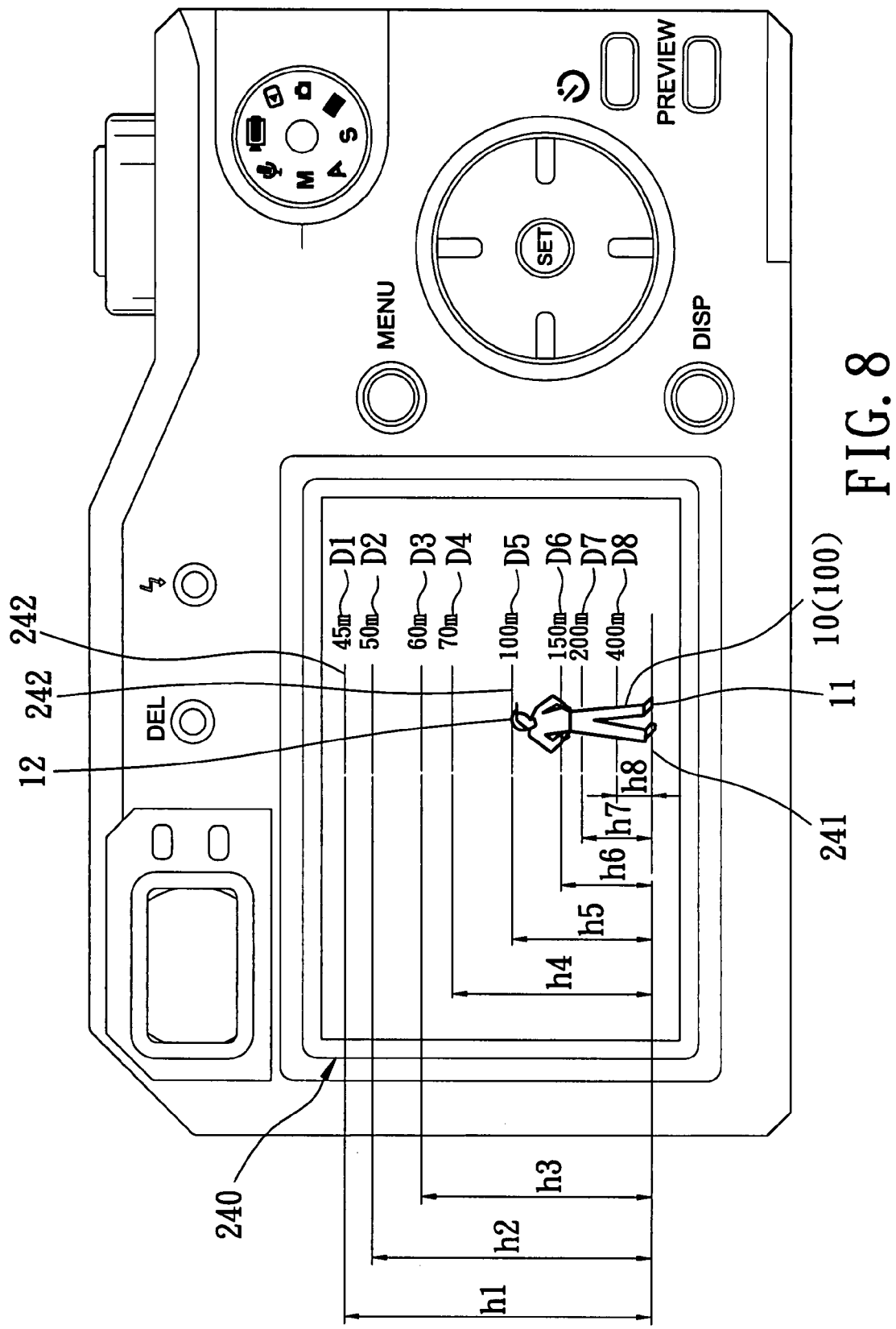
FIG. 8 is a view similar to FIG. 3, illustrating how distance of a target is estimated in the method of the first preferred embodiment.

Step 4: Referring to FIGS. 7 and 8, the processing unit 290 (see FIG. 4) is operated to calculate an image dimension (h1-h8 in this embodiment) for each of predetermined distance values (D1-D8 in this embodiment) pre-established in the processing unit 290 with reference to the selected reference dimension (H) and the focal length (d), wherein the image dimension (h1-h8) is equal to the product of the reference dimension (H) and the focal length (d) divided by the corresponding distance value (D1-D8). In this embodiment, the predetermined distance values (D1-D8) are defined as 45 m, 50 m, 60 m, 70 m, 100 m, 150 m, 200 m and 400 m, respectively. From the above relation among the reference dimension (H), the focal length (d) and the distance values (D1-D8), the processing unit 290 is able to calculate the image dimension (h1-h8) the target 100 contained in the clear image 10 should have on the display unit 240 when the target 100 is at the corresponding distance value (D1-D8) from the digital camera 200.

Step 5: Referring to FIG. 8, the processing unit 290 (see FIG. 4) is operated to control the display unit 240 such that the distance values (D1-D8) are shown on the display unit 240 at positions based on proportions of the calculated image dimensions (h1-h8). The distance values (D1-D8) are shown together with the clear image 10 containing the target 100 such that the distance of the target 100 can be estimated by the user as one of the distance values (D1-D8) corresponding to a dimension of the target 100 contained in the clear image 10 and shown on the display unit 240. Preferably, the processing unit 290 controls the display unit 240 to show scale lines 242 at positions corresponding respectively to the distance values (D1-D8), the scale lines 242 being parallel to the reference line 241. The dimension of the target 100 contained in the clear image 10 and shown on the display unit 240 is from the base point 11 on the reference line 241 to a read point 12 in the clear image 10, such as the head of the target 100, that is opposite to the base point 11. The distance of the target 100 is estimated with reference to the scale lines 242 and the read point 12 in the clear image 10. In this embodiment, the height of the target 100 contained in the clear image 10 corresponds to the image dimension (h5), and the estimated distance of the target 100 is thus 100 m.

The following are some of the advantages of this invention:

1. In this invention, the relation among image dimension (h), reference dimension (H), focal length (d) and distance value (D) is established in the processing unit 290 of the digital camera 200. Hence, when a clear image 10 containing a target 100 is obtained by the digital camera 200, the processing unit 290 is able to control the display unit 240 to display scale lines 242 corresponding to different pre-established distance values (D1-D8) at positions based on proportions of image dimensions (h1-h8) calculated according to the relation. As a result, the distance of the target 100 can be readily estimated by the user through comparing of the dimension (e.g., the height) of the target 100 contained in the clear image 10 with the scale lines 242. Unlike the prior art described hereinabove, this invention does not require the use of a reticule with vertically displaced segmented horizontal lines, or the use of a laser emitter and a laser receiver to be able to perform distance estimation. In other words, this invention can be easily implemented using components commonly found in existing digital cameras without incurring additional hardware expenses.

2. Referring to FIG. 5, this invention allows the user to select from the operating interface screen 224 a reference dimension (H), such as that for a man, a tree, a house, a flagpole or a car, or even a user-defined reference dimension, to correspond to a target 100 in the environment whose distance is to be estimated. In practice, if there is a man in the environment whose distance is to be measured, the man can be selected to be the target 100. On the other hand, if there is a car in the environment whose distance is to be measured, the car can be selected to be the target 100. The operating screen interface 224 provided in this invention is very easy to understand, and is very user-friendly and convenient for the user.

Figure 9:
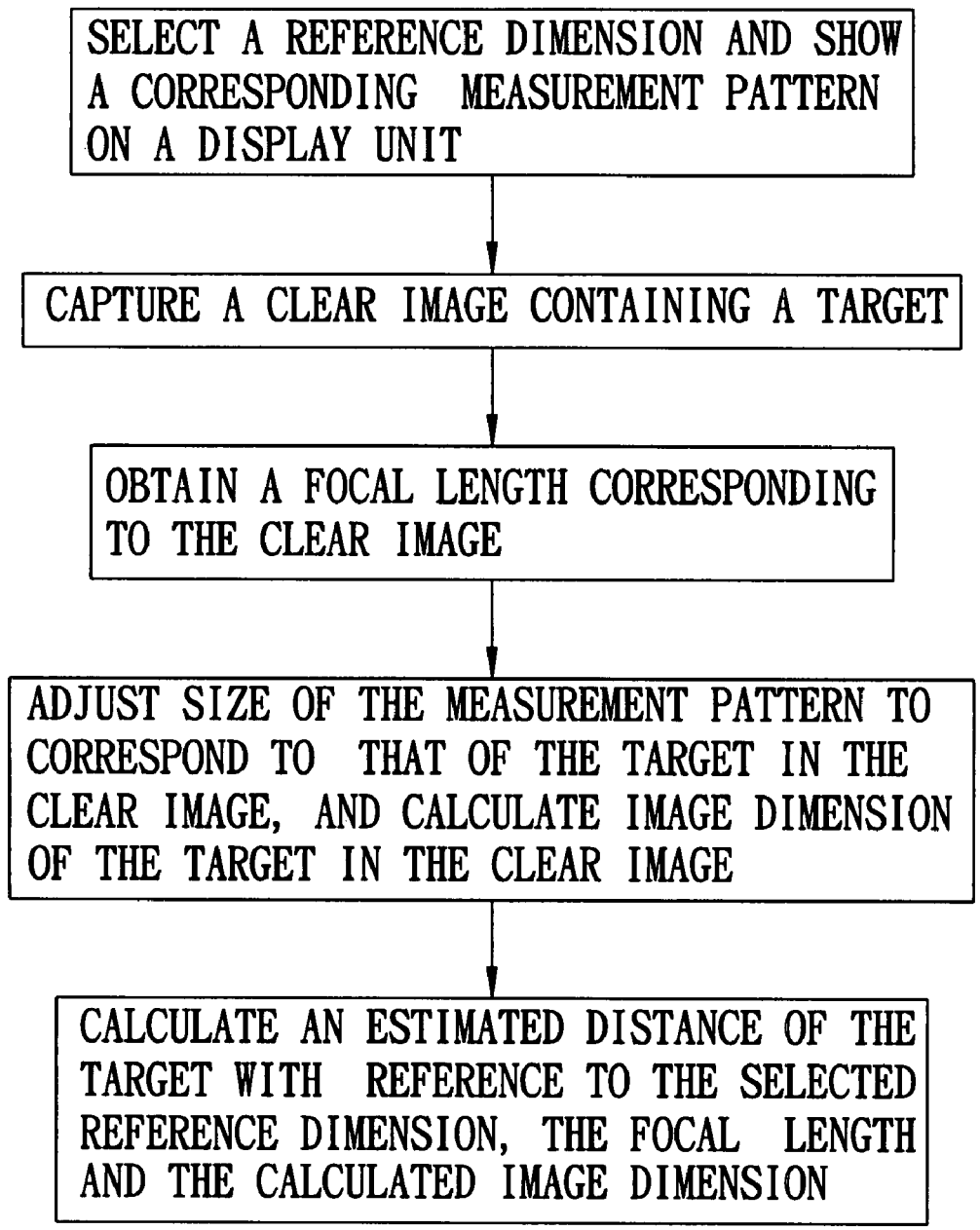
FIG. 9 is a flowchart of the second preferred embodiment of a method of distance estimation according to the present invention.
Figure 10:
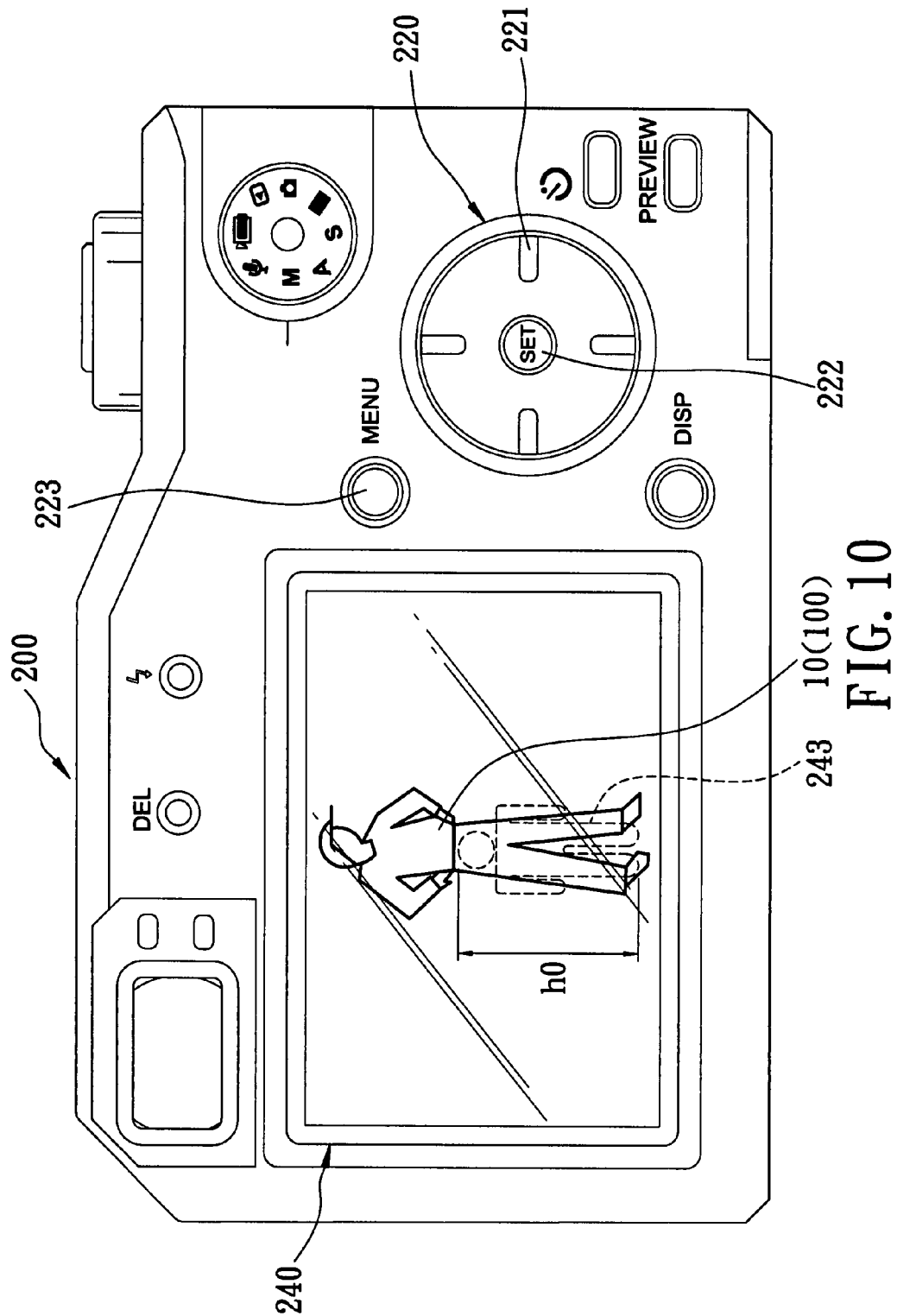
FIG. 10 is a schematic rear view of a digital camera for implementing the method of the second preferred embodiment.
Figure 11:
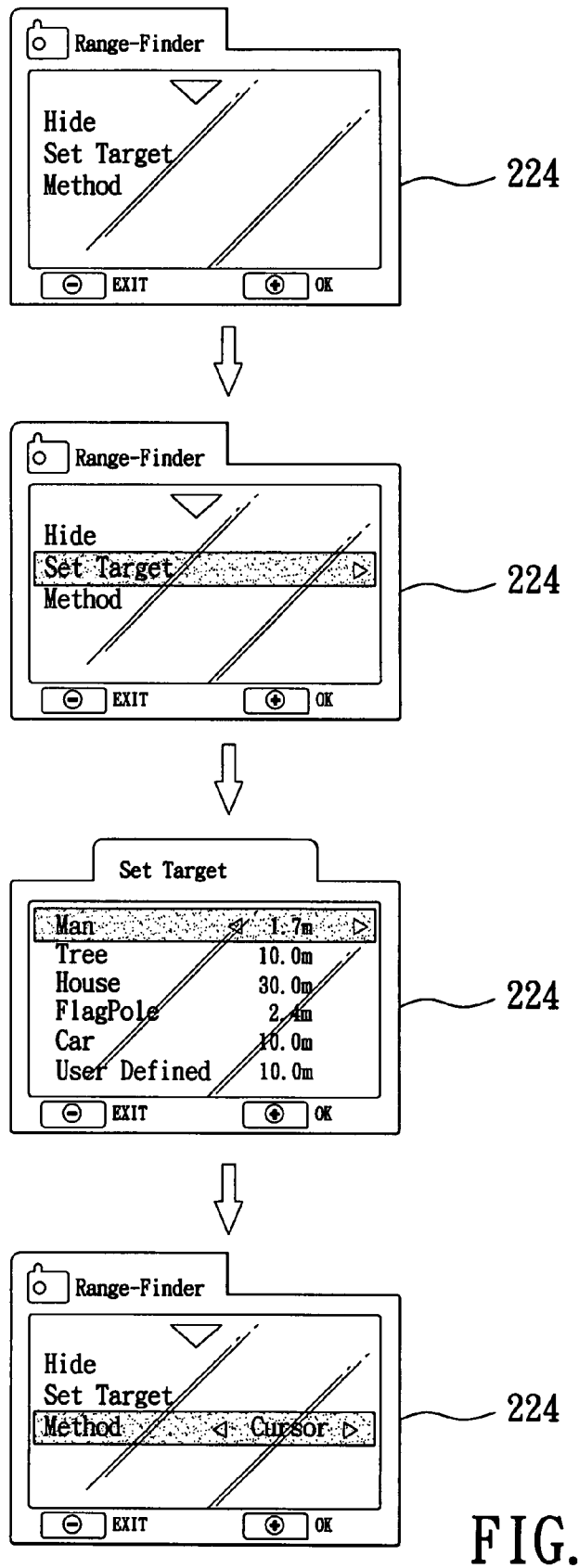
FIG. 11 illustrates a series of screen images shown on an operating interface screen of the digital camera when operated to implement the method of the second preferred embodiment.

Referring to FIGS. 9 to 11, the second preferred embodiment of the method of distance estimation according to this invention also requires a digital camera 200 for implementation and is a modification of the first preferred embodiment. The steps of the method of the second preferred embodiment are as follows:

Step 1: Like the previous embodiment, the function menu key 223 of the user interface unit 220 is operated so as to activate a Range-Finder operating interface screen 224. By operating the direction keys 221 and the confirmation key 222, one of a plurality of reference dimensions (H) pre-established in the processing unit 290 as well as a distance estimation method can be selected according to the target 100 whose distance is to be estimated. The distance estimation method of the second preferred embodiment is called a cursor scheme to distinguish from the other embodiments of this invention. In this embodiment, upon completion of the above selection, the processing unit 290 (see FIG. 4) controls the display unit 240 to show a measurement pattern 243 corresponding to the target 100 and having an initial dimension (h0). In this embodiment, since the target 100 is a man, the measurement pattern 243 is in a form of a man.

Step 2: Similar to step 2 of the previous embodiment, the digital camera 200 is operated such that a clear image 10 containing the target 100 is captured.

Step 3: Similar to step 3 of the previous embodiment, the processing unit 290 (see FIG. 4) is operated to obtain a focal length (d) corresponding to the captured clear image 10.

Figure 12:
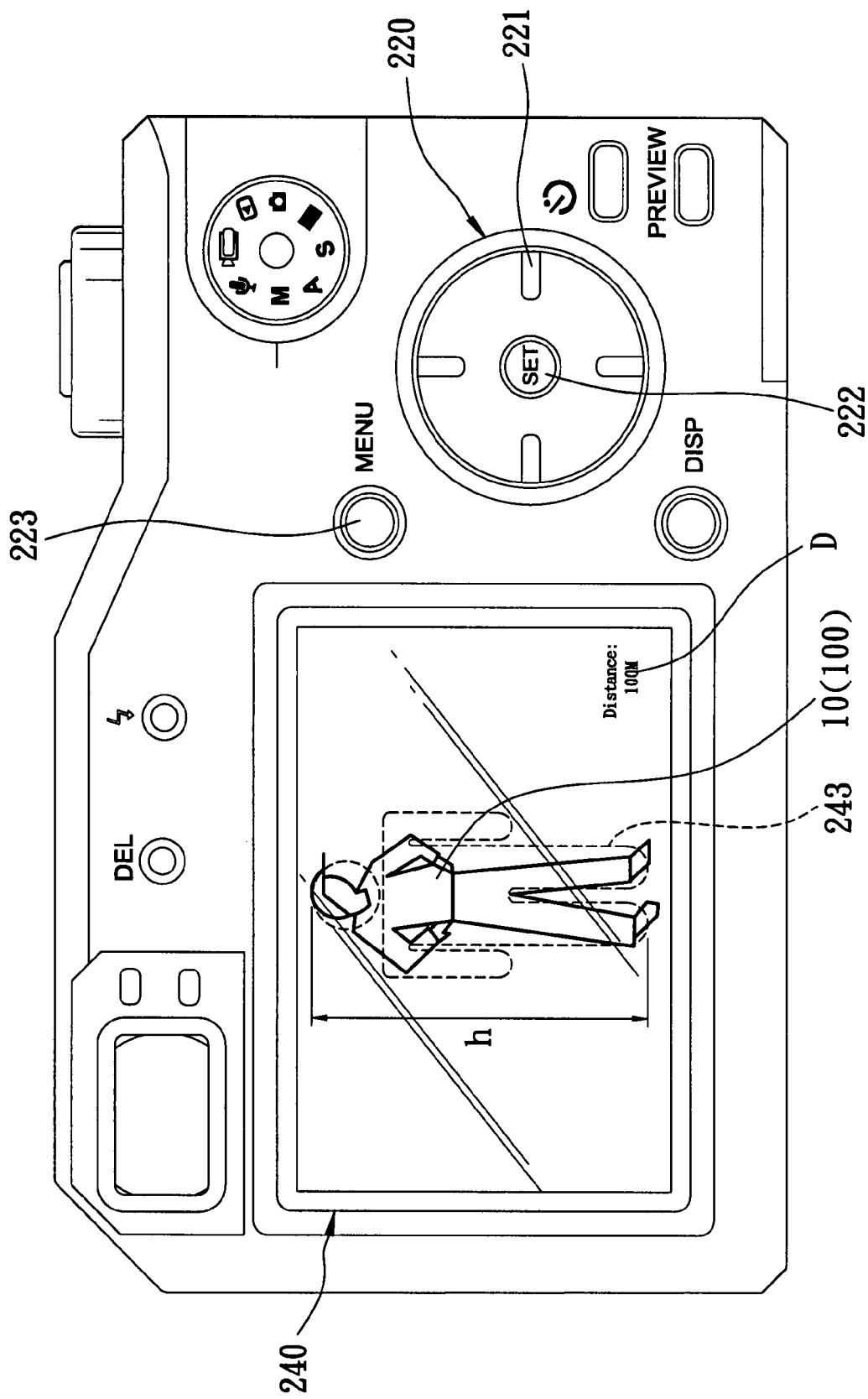
FIG. 12 is a view similar to FIG. 10, illustrating how distance of a target is estimated in the method of the second preferred embodiment.

Step 4: As shown in FIGS. 10 and 12, the size of the measurement pattern 243 shown on the display unit 240 is adjusted by the processing unit 290 (see FIG. 4) under the control of the direction keys 221 of the user interface unit 220 until the measurement pattern 243 corresponds to the target 100 contained in the clear image 10 in size. The processing unit 290 is then operated to calculate an image dimension (h) of the target 100 contained in the clear image 10 according to magnification/reduction ratio (N) of the measurement pattern 243, wherein the image dimension (h) is equal to the product of the initial dimension (h0) and the magnification/reduction ratio (N). It should be noted herein that the user interface unit 220 can include a dedicated key for adjusting the size of the measurement pattern 243 in other embodiments of this invention.

Step 5: Referring to FIG. 12, the processing unit 290 (see FIG. 4) is operated to calculate an estimated distance (D) of the target 100 with reference to the selected reference dimension (H), the focal length (d) and the image dimension (h), wherein the estimated distance (D) is equal to the product of the reference dimension (H) and the focal length (d) divided by the image dimension (h). In this embodiment, the processing unit 290 controls the display unit 240 to show the estimated distance (D) of the target 100 on a bottom right corner of the display unit 240.

Figure 13:
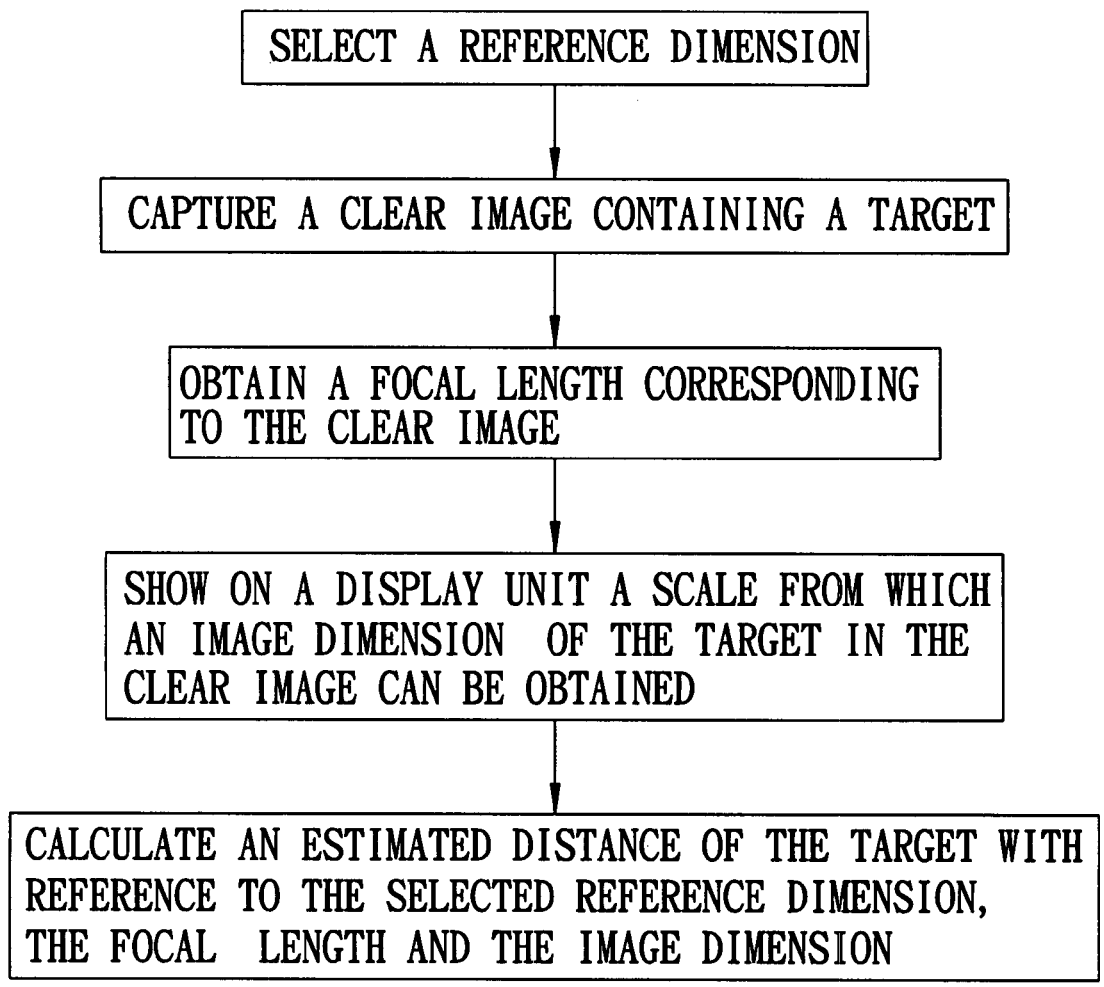
FIG. 13 is a flowchart of the third preferred embodiment of a method of distance estimation according to the present invention.
Figure 14:
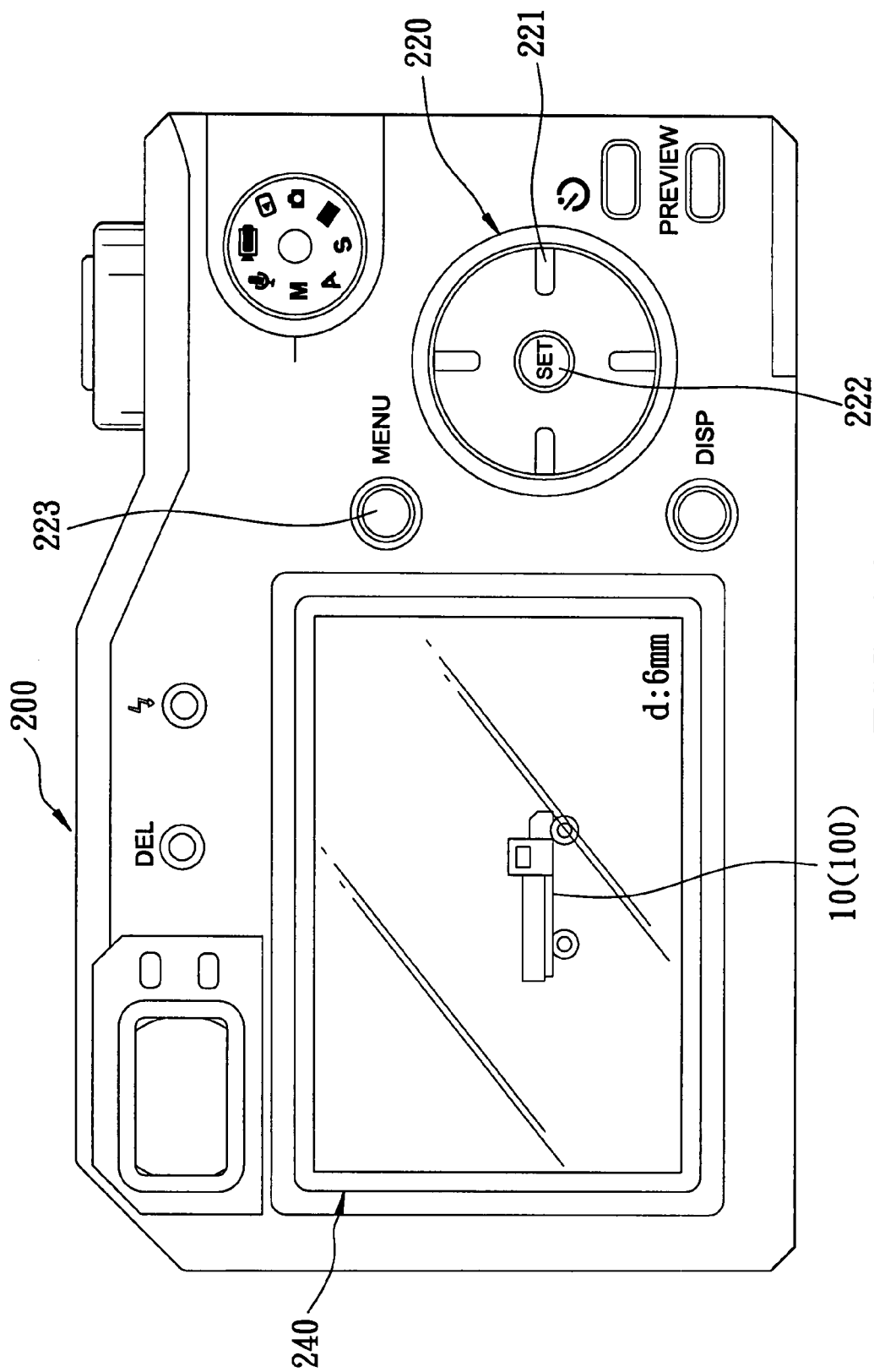
FIG. 14 is a schematic rear view of a digital camera for implementing the method of the third preferred embodiment.
Figure 15:
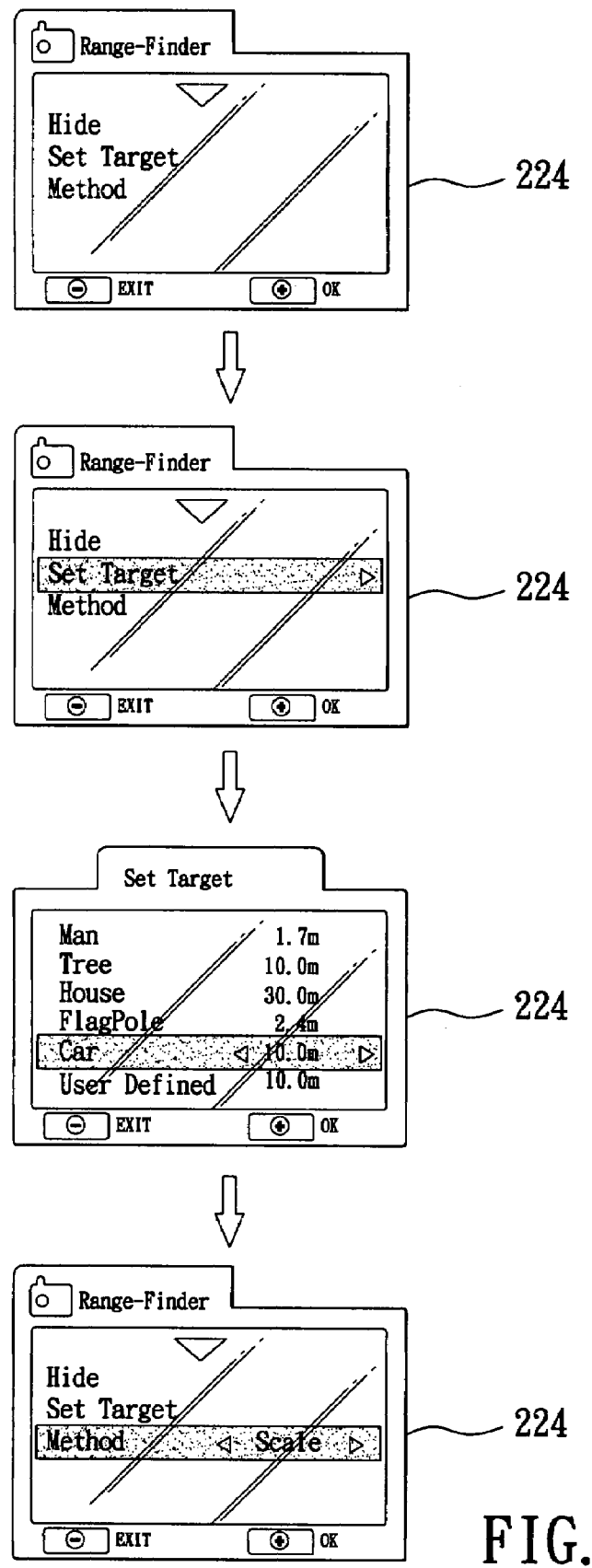
FIG. 15 illustrates a series of screen images shown on an operating interface screen of the digital camera when operated to implement the method of the third preferred embodiment.

It has thus been shown that the second preferred embodiment of this invention is capable of achieving the same effects of the first preferred embodiment. Referring to FIGS. 13 to 15, the third preferred embodiment of the method of distance estimation according to this invention likewise requires a digital camera 200 for implementation and is a modification of the second preferred embodiment. The steps of the method of the third preferred embodiment are as follows:

Step 1: Like the previous embodiments, the function menu key 223 of the user interface unit 220 is operated so as to activate a Range-Finder operating interface screen 224. By operating the direction keys 221 and the confirmation key 222, one of a plurality of reference dimensions (H) pre-established in the processing unit 290 as well as a distance estimation method can be selected according to the target 100 whose distance is to be estimated. The distance estimation method of the third preferred embodiment is called a scale scheme to distinguish from the other embodiments of this invention. In this embodiment, the target 100 is a car, and the pre-established reference dimension (H) corresponding thereto is 10 m.

Step 2: Similar to step 2 of the previous embodiments, the digital camera 200 is operated such that a clear image 10 containing the target 100 is captured.

Step 3: Similar to step 3 of the previous embodiments, the processing unit 290 (see FIG. 4) is operated to obtain a focal length (d) corresponding to the captured clear image 10. Unlike the previous embodiments, the processing unit 290 controls the display unit 240 to show numerical value of the focal length (d), e.g., 6 mm, obtained thereby.

Figure 16:
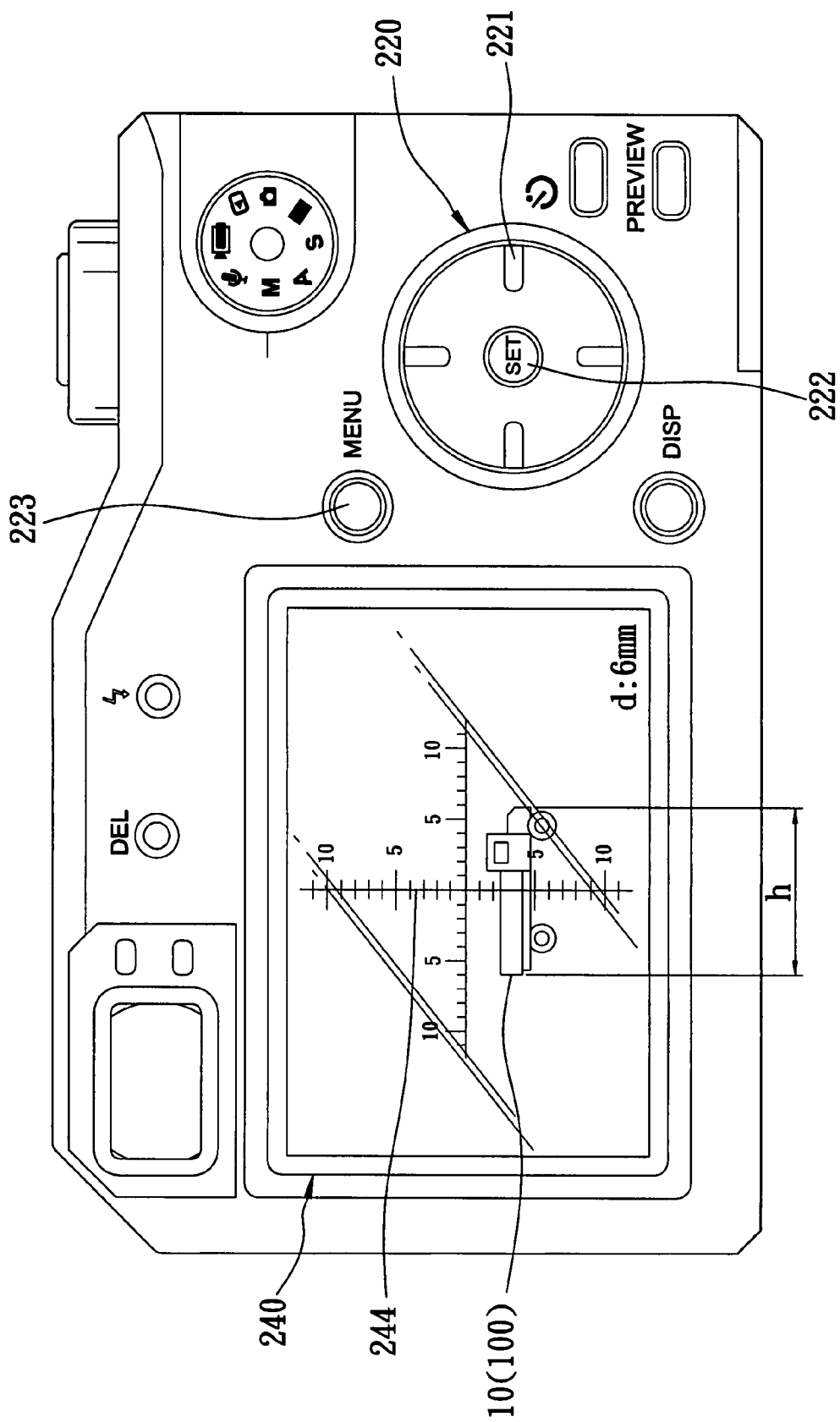
FIG. 16 is a view similar to FIG. 14, illustrating how distance of a target is estimated in the method of the third preferred embodiment.

Step 4: As shown in FIG. 16, the processing unit 290 (see FIG. 4) is operated to control the display unit 240 to show a scale 244 from which an image dimension (h) of the target 100 contained in the clear image 10 can be obtained by the user. In this example, the image dimension (h) is 12 mm.

Step 5: Based on the relation among the selected reference dimension (H), the focal length (d) and the image dimension (h), the user can perform the necessary calculation to determine an estimated distance (D) of the target 100, wherein the estimated distance (D) is equal to the product of the reference dimension (H) and the focal length (d) divided by the image dimension (h). In this example, the estimated distance (D) is 10 m×6 mm/12 mm=5 m.

It has thus been shown that the third preferred embodiment of this invention is also capable of achieving the same effects of the first and second preferred embodiments.

In sum, this invention provides a method of distance estimation to be implemented using a digital camera 200. In this invention, distance estimation is possible without altering the hardware configuration of existing digital cameras to avoid incurring higher manufacturing costs. In addition, several distance estimation schemes are available for selection by the user.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A method of distance estimation to be implemented using a digital camera including a lens unit, a user interface unit, an image sensing unit, a display unit operable to display a target whose distance is to be estimated, and a processing unit coupled to the lens unit, the user interface unit, the image sensing unit and the display unit, the method comprising:
   a) establishing in the processing unit reference dimensions that correspond respectively to different kinds of targets, and a set of predetermined distance values;
   b) selecting one of the reference dimensions according to the target whose distance is to be estimated through the user interface unit;
   c) enabling operation of the digital camera such that a clear image containing the target is captured through the lens unit and the image sensing unit;
   d) enabling operation of the processing unit to obtain a focal length corresponding to the clear image captured in step c);
   e) enabling operation of the processing unit to calculate an image dimension for each of the predetermined distance values with reference to the reference to the reference dimension selected in step b) and the focal length obtained in step d), wherein the image dimension is equal to the product of the reference dimension and the focal length divided by the corresponding distance value; and
   f) enabling the processing unit to control the display unit such that the distance values are shown on the display unit at positions based on proportions of the image dimensions calculated in step e), the distance values being shown together with the clear image containing the target, wherein the distance of the target can be estimated as one of the distance values corresponding to a dimension of the target contained in the clear image and shown on the display unit.

2. The method as claimed in claim 1, wherein, in step c), the clear image containing the target is obtained through zoom in/zoom out and auto focus adjustment of the digital camera.

3. The method as claimed in claim 1, wherein a reference line is shown on the display unit in step b), and a base point in the clear image is aligned with the reference line in step c).

4. The method as claimed in claim 3, wherein, in step f), the processing unit controls the display unit to show scale lines at positions corresponding respectively to the distance values, the scale lines being parallel to the reference line.

5. The method as claimed in claim 4, wherein, in step f), the dimension of the target contained in the clear image and shown on the display unit is from the base point to a read point in the clear image that is opposite to the base point, the distance of the target being estimated with reference to the scale lines and the read point in the clear image.

* * * * *